(12) United States Patent
Yamazaki

(10) Patent No.: US 8,172,026 B2
(45) Date of Patent: May 8, 2012

(54) VEHICLE PEDAL SUPPORT SYSTEM

(75) Inventor: Yasunobu Yamazaki, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 322 days.

(21) Appl. No.: 12/448,812

(22) PCT Filed: Feb. 18, 2008

(86) PCT No.: PCT/IB2008/000354
§ 371 (c)(1),
(2), (4) Date: Jul. 8, 2009

(87) PCT Pub. No.: WO2008/102231
PCT Pub. Date: Aug. 28, 2008

(65) Prior Publication Data
US 2010/0147101 A1    Jun. 17, 2010

(30) Foreign Application Priority Data

Feb. 19, 2007    (JP) ................................ 2007-038395

(51) Int. Cl.
*B60K 28/10* (2006.01)
(52) U.S. Cl. ...................................................... 180/274
(58) Field of Classification Search .................. 180/274, 180/275; 74/512, 560
See application file for complete search history.

(56) References Cited

U.S. PATENT DOCUMENTS

| | | | | |
|---|---|---|---|---|
| 6,006,626 A * | 12/1999 | Notake et al. | | 74/512 |
| 6,041,674 A * | 3/2000 | Kato | | 74/512 |
| 6,070,488 A * | 6/2000 | Yabusaki et al. | | 74/512 |
| 6,076,422 A | 6/2000 | Tabata | | |
| 7,066,047 B2 * | 6/2006 | Amano et al. | | 74/512 |
| 7,111,703 B2 * | 9/2006 | Endo et al. | | 180/274 |
| 7,383,752 B2 * | 6/2008 | Suzuki | | 74/512 |
| 2005/0103151 A1 | 5/2005 | Yoon | | |
| 2006/0162481 A1 * | 7/2006 | Sato | | 74/512 |

FOREIGN PATENT DOCUMENTS

| | | |
|---|---|---|
| EP | 0 719 697 A1 | 7/1996 |
| EP | 0 879 745 A2 | 11/1998 |
| EP | 1 247 710 A1 | 10/2002 |
| JP | A-10-324228 | 12/1998 |
| JP | A-11-043073 | 2/1999 |
| JP | B2-3125715 | 11/2000 |
| JP | A-2003-106501 | 4/2003 |
| JP | A-2005-059667 | 3/2005 |
| JP | A-2005-231548 | 9/2005 |
| JP | A-2005-285066 | 10/2005 |
| JP | A-2006-321381 | 11/2006 |

* cited by examiner

*Primary Examiner* — Paul N Dickson
*Assistant Examiner* — Robert A Coker
(74) *Attorney, Agent, or Firm* — Oliff & Berridge, PLC

(57) ABSTRACT

A vehicle pedal support system includes: a pedal bracket mechanism that is disposed between body-side components and pivotably supports a vehicle pedal, the body-side components being displaced relative to each other so that a mutual distance between the body-side components in the vehicle longitudinal direction is decreased when an external force equal to or greater than a predetermined value acts on a vehicle front section; and a link mechanism that connects a hydraulic pressure conversion section to an upper-end side of the vehicle pedal in a relatively rotatable manner. When the link mechanism comes into contact with a non-deformation portion, the link mechanism is pressed toward the vehicle front section, and thereby the depression surface of the vehicle pedal is rotationally displaced about the pivot toward the front of the vehicle.

10 Claims, 6 Drawing Sheets

VEHICLE PEDAL SUPPORT SYSTEM

BACKGROUND OF THE INVENTION

1. Field of Invention

The invention relates to a vehicle pedal support system using a link mechanism.

2. Description of Related Art

For example, Japanese Patent No. 3125715 discloses a technique in which when an external force equal to or greater than a predetermined value acts on the front section of a vehicle from the front side of the vehicle and the dash panel is displaced toward the rear side of the vehicle, a swing link connected to the rear end portion of a push rod comes into contact with an extended portion of a sub bracket extended obliquely front lower side of the vehicle from a instrumental panel reinforcement, and the above-described extended portion rotates in a counterclockwise direction about a mounting bolt, which connects a main bracket and the sub bracket together, while deforming, thereby causing the swing link to swing in the counterclockwise direction so that the depression surface of the vehicle pedal connected to the swing link via a connecting link is rotationally displaced toward the front side of the vehicle.

However, in the configuration according to the above-described technique, the contact part between the swing link and the extended portion is on the side of a deformation part that rotates in the counterclockwise direction about the mounting bolt while deforming, which makes it difficult to efficiently increase the amount of rotational displacement of the swing link. The above-described technique thus leaves room for improvement in this respect.

SUMMARY OF THE INVENTION

The invention provides a vehicle pedal support system that makes it possible to rotationally displace the depression surface of a vehicle pedal toward the front of the vehicle front side with efficiency when an external force equal to or greater than a predetermined value acts on the vehicle front section.

A vehicle pedal support system according to an aspect of the invention includes: body-side components that are separated from each other in a longitudinal direction of the vehicle, and are displaced relative to each other so that a mutual distance between the body-side components in the longitudinal direction of the vehicle is decreased when an external force equal to or greater than a first predetermined value acts on a vehicle front section; a vehicle pedal that has at its lower end portion a depression surface to which a depression force of a driver is applied; a pedal bracket mechanism that is disposed between the body-side components and pivotably supports the vehicle pedal about a pivot; hydraulic pressure conversion means for converting the depression force applied to the depression surface of the vehicle pedal into hydraulic pressure while being swingably supported on the pedal bracket mechanism; and a link mechanism that connects the hydraulic pressure conversion means to an upper-end side of the vehicle pedal in a relatively rotatable manner, and transmits the depression force to the hydraulic pressure conversion means, wherein: a vehicle rear section side of the pedal bracket mechanism includes a deformation portion that serves as a point where the vehicle rear section side of the pedal bracket mechanism starts to undergo bending deformation toward a vehicle rear lower side at the time of the relative displacement between the body-side components, and a non-deformation portion that is located on a vehicle upper side with respect to the deformation portion and comes into contact with the link mechanism at the time of the relative displacement between the body-side components; and the link mechanism is pressed toward the vehicle front section at the time of the relative displacement between the body-side components, thereby causing the depression surface of the vehicle pedal to pivot toward the vehicle front section.

According to the above-described aspect, the pedal bracket mechanism is disposed between the body-side components that are separated from each other in the vehicle longitudinal direction, and the vehicle pedal is pivotably supported on the pedal bracket mechanism about the pivot. During normal operation of the vehicle pedal, when the depression force of the driver is applied to the depression surface of this vehicle pedal, the vehicle pedal swings about the pivot toward the front of the vehicle. Because the upper end side of the vehicle pedal and the hydraulic pressure conversion means are connected to each other via the link mechanism in a relatively rotatable manner, when the driver steps on the depression surface of the vehicle pedal, the depression force applied at this time is transmitted to the hydraulic pressure conversion means via the link mechanism, and converted into hydraulic pressure.

On the other hand, when an external force equal to or greater than a first predetermined value acts on the vehicle front section, a relative displacement occurs between the above-described body-side components so that their mutual distance in the vehicle longitudinal direction diminishes. Due to such a relative displacement, the rear portion side of the pedal bracket mechanism is subjected to bending deformation toward the vehicle rear lower side at the deformation portion. In accordance with this bending deformation, the relative displacement between the body-side components in the vehicle longitudinal direction proceeds, and following this relative displacement, the link mechanism and the vehicle pedal, which is pivotably supported on the pedal bracket mechanism, are also relatively displaced toward the vehicle rear side, and the link mechanism (such as, a part of the link mechanism) comes into contact with the rear portion side of the pedal bracket mechanism.

At this time, according to this aspect of the invention, the link mechanism is brought into contact with the non-deformation portion, which is located on the vehicle upper side with respect to the deformation portion on the rear portion side of the pedal bracket mechanism. Therefore, the link mechanism is pressed toward the vehicle front side on the rear portion side of the pedal bracket mechanism at an intended timing, without being affected by the bending deformation that occurs on the rear portion side of the pedal bracket mechanism. As a result, the depression surface of the vehicle pedal is rotationally displaced about the pivot toward the vehicle front side with efficiency.

Further, the vehicle pedal support system according to the above-described aspect may further include a separating mechanism that serves as a point where the vehicle rear section side of the pedal bracket mechanism and the vehicle front section side of the pedal bracket mechanism start to separate from each other in a portion of the pedal bracket mechanism extending on the vehicle lower side with respect to the deformation portion after the vehicle rear section side of the pedal bracket mechanism undergoes bending deformation at the deformation portion at the time of the relative displacement between the body-side components.

Further, the vehicle pedal support system according to the above-described aspect may be configured such that when an external force acting on the vehicle front section exceeds a second predetermined value which is greater than the first predetermined value, the vehicle rear section side of the pedal bracket mechanism and the vehicle front section side of the pedal bracket mechanism are separated from each other by the separating mechanism.

Further, the vehicle pedal support system according to the above-described aspect, the separating mechanism may be a mechanism in which a slit that is cut upward from a lower edge of the vehicle rear section side of the pedal bracket mechanism, and a bolthole that is formed in an upper end portion on the vehicle front section side of the pedal bracket mechanism, the slit and the bolthole being fastened together with a predetermined fastening torque using a bolt and a nut.

According to the above-described aspect, as the relative displacement between the body-side components proceeds further after the rear portion side of the pedal bracket mechanism starts to bend at the deformation portion, the front portion side of the pedal bracket mechanism separates from the rear portion side of the pedal bracket mechanism, starting at the point of the separating mechanism, in the portion of the pedal bracket mechanism which extends toward the vehicle lower side with respect to the deformation portion. Therefore, no load will be transferred to the body-side component that supports the rear portion side of the pedal bracket mechanism thereafter.

Further, in the vehicle pedal support system according to the above-described aspect, the pedal bracket mechanism may include a first pedal bracket that is attached toward the vehicle dash panel of the body-side components (such as, the dash panel is arranged to divide an engine compartment from a cabin), a second pedal bracket that is attached toward an instrumental panel reinforcement of the body-side components which is located toward the rear of the vehicle with respect to the vehicle dash panel while extending in a vehicle width direction, and that is provided with the deformation portion and the non-deformation portion, and a third pedal bracket that is provided between the first pedal bracket and the second pedal bracket that joins the first pedal bracket to the second pedal bracket.

According to the above-described aspect, the pedal bracket includes a first pedal bracket that is attached on the vehicle dash panel side, a second pedal bracket that is attached on the instrumental panel reinforcement side, and a third pedal bracket that is arranged between the first pedal bracket and the second pedal bracket and joins them to each other, and the above-described deformation portion is provided in the rear portion of the pedal bracket. Therefore, by forming the third pedal bracket in, for example, an L-shaped or the like as seen in side view, and joining the third pedal bracket to the second pedal bracket so that the portion located on the vehicle lower side with respect to the deformation portion of the second pedal bracket is extended further toward the vehicle lower side, the load acting toward the vehicle rear side can be exerted at a position largely separated toward the vehicle lower side from the deformation portion set in the second pedal bracket, at the time of relative displacement between the body-side components. Since a greater bending moment can be exerted on the deformation portion in the second pedal bracket in this way, the second pedal bracket can be quickly subjected to bending deformation at the deformation portion.

Further, the vehicle pedal support system according to the above-described aspect may further include a separating mechanism that serves as a point where the second pedal bracket and the third pedal bracket start to separate from each other in a portion of the second pedal bracket extending on the vehicle lower side with respect to the deformation portion after the second pedal bracket undergoes bending deformation at the deformation portion at the time of the relative displacement between the body-side components.

Further, the vehicle pedal support system according to the above-described aspect may be configured such that when an external force acting on the vehicle front section exceeds a second predetermined value which is greater than the first predetermined value, the second pedal bracket and the third pedal bracket are separated from each other by the separating mechanism.

Further, the vehicle pedal support system according to the above-described aspect, the separating mechanism may be a mechanism in which a slit that is cut upward from a lower edge of the third pedal bracket, and a bolthole that is formed in an upper end portion on the third pedal bracket, the slit and the bolthole being fastened together with a predetermined fastening torque using a bolt and a nut.

According to the above-described aspect, as the relative displacement between the body-side components proceeds further after the second the pedal bracket starts to bend at the deformation portion, the third pedal bracket separates from the second the pedal bracket, starting at the point of the separating mechanism, in the portion of the pedal bracket mechanism which extends toward the vehicle lower side with respect to the deformation portion. Therefore, no load will be transferred to the body-side component that supports the second the pedal bracket thereafter.

Further, in the vehicle pedal support system according to the above-described aspect, the deformation portion may have a low-rigidity.

Further, in the vehicle pedal support system according to the above-described aspect, the deformation portion may be protruding portion that is protruded to the vehicle front side.

Further, in the vehicle pedal support system according to the above-described aspect, the deformation portion may have a weak structure.

The vehicle pedal support system according to the above-described aspect provides an advantage in that the depression surface of the vehicle pedal can be rotationally displaced toward the front side of the vehicle with efficiency when an external force equal to or greater than a predetermined value acts on the vehicle front section.

Further, the vehicle pedal support system according to the above-described aspect provides an advantage in that, the second pedal bracket can be quickly subjected to bending deformation at the deformation portion because the third pedal bracket is provided to join the first pedal bracket and the second pedal bracket, thereby enabling quick displacing action of the depression surface of the vehicle pedal toward the front of the vehicle.

Further, because the vehicle pedal support system according to the above-described aspect includes a separating mechanism serving as a point where the vehicle front section side of the pedal bracket mechanism starts to separate from the vehicle rear section side of the pedal bracket mechanism, in a portion of the pedal bracket mechanism extending on the vehicle lower side with respect to the deformation portion, after the vehicle rear section side of the pedal bracket mechanism undergoes bending deformation at the deformation portion, the vehicle pedal support system provides an advantage in that the load weight transferred to the body-side component, which supports the rear portion side of the pedal bracket mechanism, may be reduced.

BRIEF DESCRIPTION OF THE DRAWINGS

The foregoing and/or further objects, features and advantages of the invention will become apparent from the following description of preferred embodiment with reference to the accompanying drawings, in which like numerals are used to represent like elements and wherein.

DETAILED DESCRIPTION OF EMBODIMENTS

Hereinafter, a vehicle pedal support system according to an embodiment of the invention will be described with reference to FIGS. 1 to 6. It should be noted that the arrow FR, shown in these drawings as appropriate, indicates the front side of a vehicle, the arrow-UP indicates the upper side of the vehicle, and the arrow IN indicates the inner side with respect to the vehicle width direction.

Figure 1:
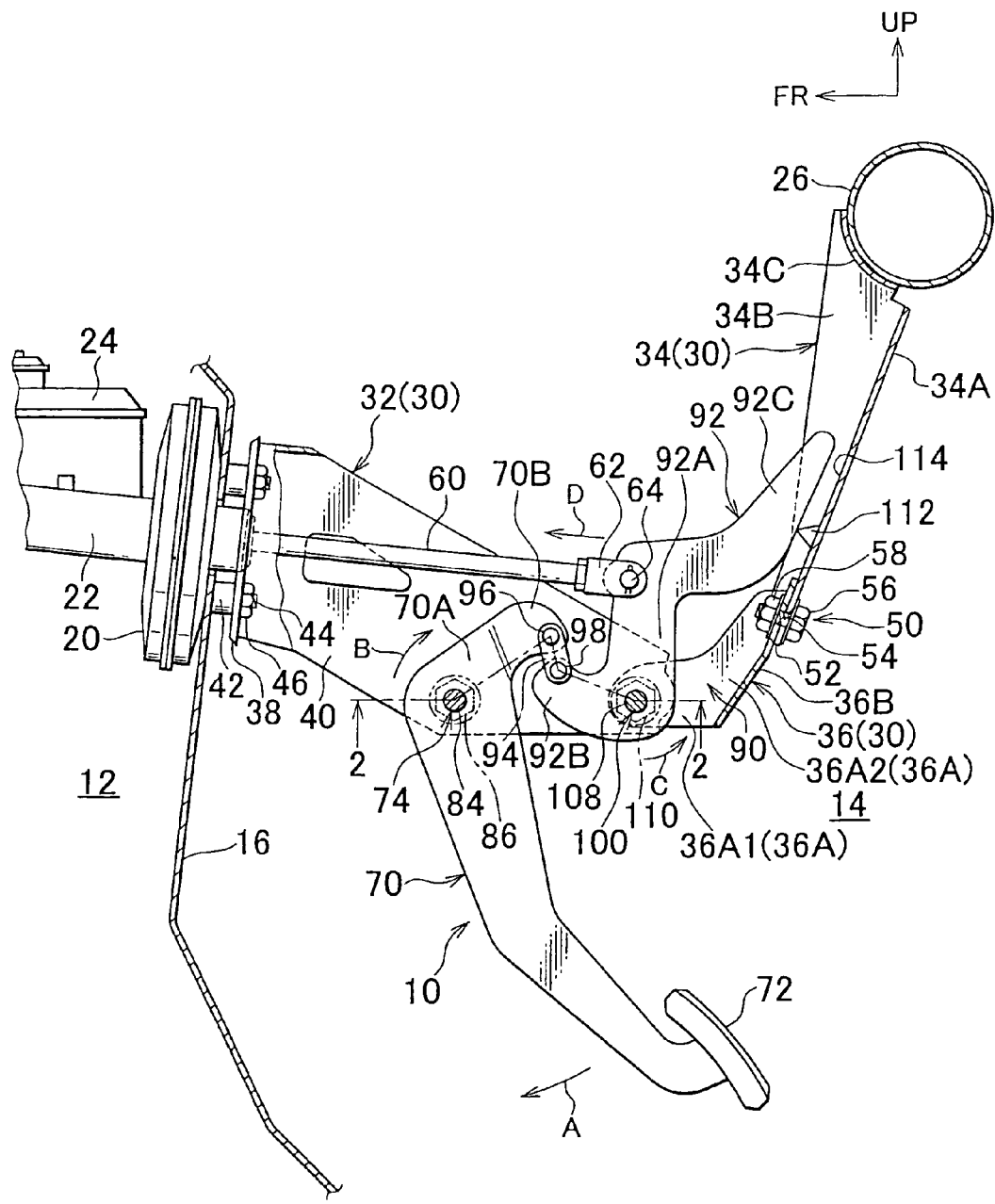
FIG. 1 is a side view of the general configuration of a brake pedal support system according to an embodiment of the invention.
Figure 2:
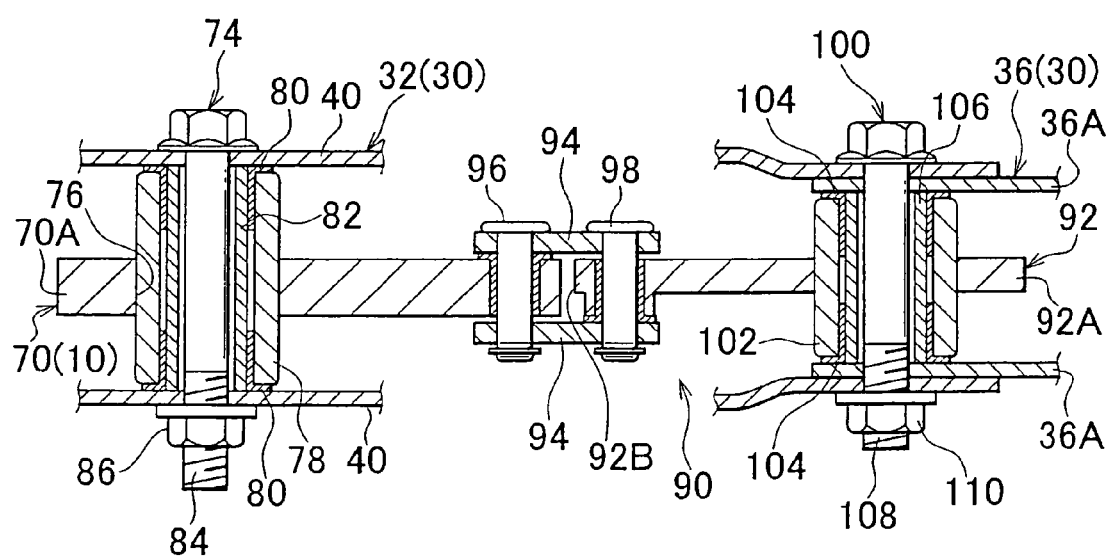
FIG. 2 is a cross-sectional view taken along the line 2-2 of FIG. 1.

FIG. 1 is a side view of the general configuration of a support system for a suspended brake pedal 10 according to this embodiment. FIG. 2 is a sectional view taken along the line 2-2 of FIG. 1. Below, the general configuration of the brake pedal 10 and its peripheral structure will be described with reference to these drawings.

A first body-side component, in this case the dash panel 16 is arranged substantially vertically to divide an engine compartment 12 from the passenger compartment 14. An upper end portion of the dash panel 16 may be spot welded to a cowl inner panel that is arranged with its longitudinal direction aligned in the vehicle width direction and constitutes a part of a cowl. In addition, a lower end portion of the dash panel 16 may be spot welded to a floor panel (not shown).

A brake booster 20 that boosts the depression force applied to the brake pedal 10, a hydraulic pressure conversion means for converting the pressure boosted by the brake booster 20 into hydraulic pressure, such as the master cylinder 22, and a reservoir tank 24 for storing and replenishing brake fluid while following changes in the volume of a hydraulic system, are integrally disposed on the front side of the above-described dash panel 16.

On the other hand, a instrumental panel reinforcement 26 (form of pipe), which is a high-strength and high-rigidity member serving as a (second) body-side component arranged with its longitudinal direction aligned with substantially the vehicle width direction, is disposed on the vehicle rear side of the dash panel 16.

A pedal bracket 30 is disposed between the dash panel 16 and the instrumental panel reinforcement 26 and suspended between these components. The pedal bracket 30 includes a main pedal bracket 32, which functions as a first pedal bracket, fixed to the dash panel 16 side, a sub pedal bracket 34, which functions as a second pedal bracket, fixed to the instrumental panel reinforcement 26 side, and a pedal bracket support 36, which functions as a third pedal bracket, that connects the rear end portion of the main pedal bracket 32 to the front end portion of the sub pedal bracket 34. In other words, the pedal bracket 30 is divided into three parts: the main pedal bracket 32, the sub pedal bracket 34, and the pedal bracket support 36.

The main pedal bracket 32 includes a base plate portion 38 arranged parallel to the dash panel 16 and constituting a seating surface on which to the dash panel 16, and a pair of side plate portions 40 that extend toward the vehicle rear side from near both side portions in the vehicle width direction of the base plate portion 38. As seen in the plan view, the main pedal bracket 32 as a whole has a shape with its both sides projecting in the same direction. Cylindrical collars 42 are secured to the four corners in the front surface of the base plate portion 38. With the collars 42 abutted against the dash panel 16, stud bolts 44 projecting from the brake booster 20 are inserted into the collars 42, and nuts 46 are threaded onto the stud bolts 44 from the passenger compartment 14 to fix the base plate portion 38 to the dash panel 16. It should be noted that a dash insulator (not shown) used as a sound insulator is interposed between the dash panel 16 and the base plate portion 38.

On the other hand, the sub pedal bracket 34 includes a bottom wall portion 34A, a pair of left and right side wall portions 34B in the vehicle width direction, and a proximal end portion 34C that joins the bases (upper end portions) of the pair of left and right side wall portions 34B in the vehicle width direction to each other. As seen from the vehicle lower side, the sub pedal bracket 34 as a whole has a shape with its both sides projecting in the same direction. The proximal end portion 34C is formed as an arc surface having the same radius of curvature as the outer peripheral surface of the instrumental panel reinforcement 26, and welded to the outer peripheral surface of the instrumental panel reinforcement 26. Further, the sub pedal bracket 34 extends downward and diagonally toward the front of the vehicle from the front lower portion of the outer peripheral surface of the instrumental panel reinforcement 26.

Further, the pedal bracket support 36 includes a pair of left and right side wall portions 36A in the vehicle width direction, which are formed in a substantially L shape as seen in plan view. Each of the side wall portions 36A includes a side-wall front portion 36A1 that extends along the longitudinal direction of the vehicle, and a side wall rear portion 36A2 that extends from the rear end portion of the side-wall front portion 36A1 to the vehicle upper side toward the sub pedal bracket 34 side. The rear end portions of the pair of left and right side-wall rear portions 36A2 in the vehicle width direction are interconnected by the bottom wall portion 36B. Therefore, the sectional shape of this portion is such that both sides in the vehicle width direction project in the same direction. Further, the side-wall front portions 36A1 of the pedal bracket support 36 are inserted on the inner side in the vehicle width direction of the pair of side plate portions 40 of the main pedal bracket 32, and are connected to the pair of side plate portions 40 so as to be relatively rotatable about a second pivot 100 described later. Further, the side-wall rear portions 36A2 of the pedal bracket support 36 are inserted on the inner side in the vehicle width direction of the pair of side wall portions 34B of the sub pedal bracket 34 so as to partially overlap, and with the bottom wall portion 34A and the side wall portion 34B aligned therewith, fastened in such a way as to be separable at the point of a separating mechanism 50 described later.

Figure 3:
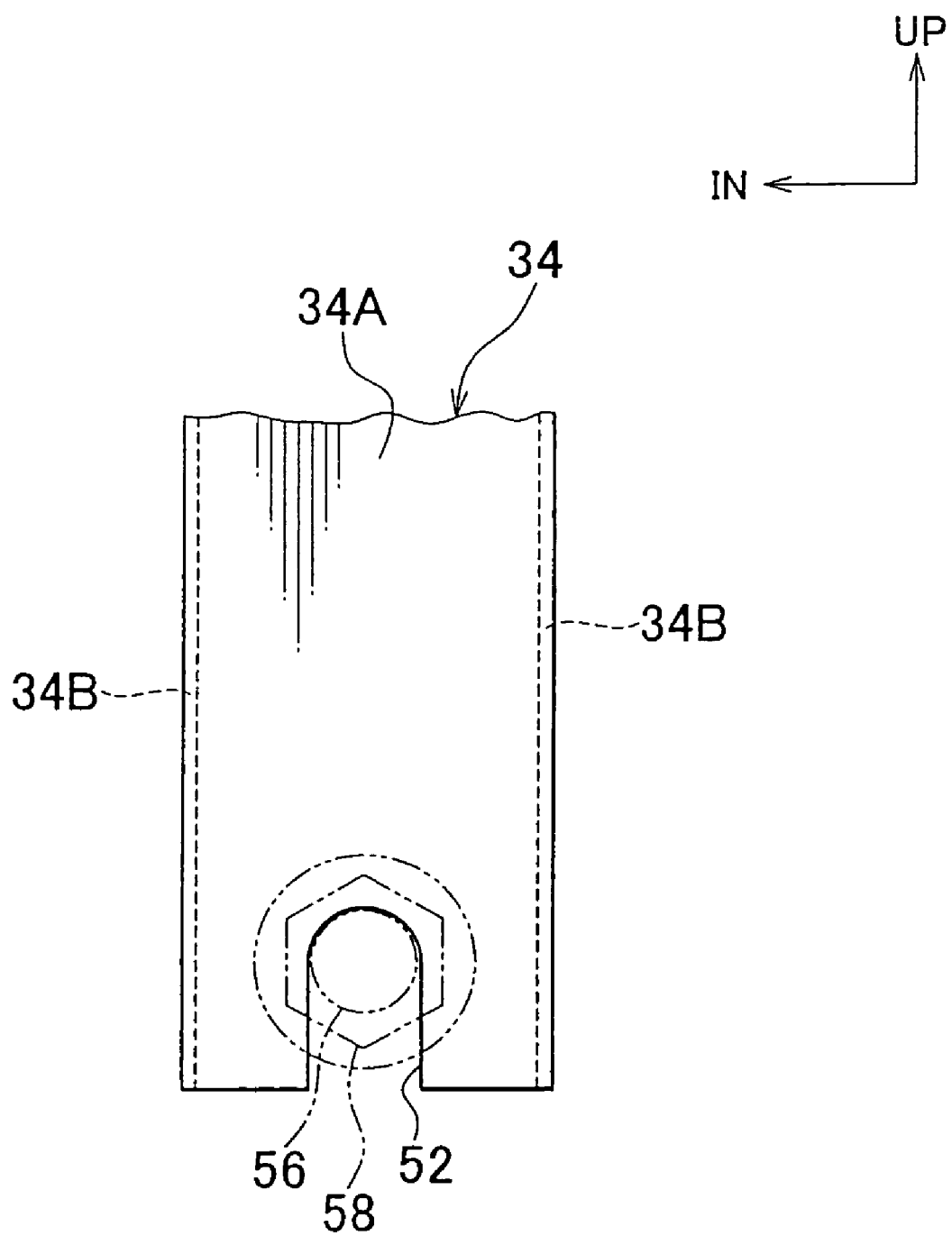
FIG. 3 is a rear view of a separating mechanism shown in FIG. 1 as seen from the vehicle rear side.

That is, as shown in FIG. 3, a slit 52 is formed at the lower end portion of the bottom wall portion 34A of the sub pedal bracket 34. The slit 52 is cut upward from the lower edge of the bottom wall portion 34A. Further, a bolthole 54 (see FIG. 1) is formed at the upper end portion of the bottom wall portion 36B of the pedal bracket support 36. The bolthole 54 is aligned with the terminal end (upper end) of the slit 52, followed by fastening with a predetermined fastening torque by means of a bolt 56 and a nut 58, thereby connecting the upper end portion of the bottom wall portion 36B of the pedal bracket support 36 to the lower end portion of the bottom wall portion 34A of the sub pedal bracket 34 in a detachable manner.

The brake pedal 10 is pivotally supported near the longitudinally intermediate portion of the pair of left and right side plate portions 40 in the vehicle width direction of the main pedal bracket 32 described above. More specifically, the brake pedal 10 includes a pedal arm 70 formed in a substantially dogleg shape as seen in side view, and a pedal pad 72 attached to the lower end portion of the pedal arm 70 and serving as a depression surface to which a depression force of the driver is applied. The pedal arm 70 is supported by the pair of side plate portions 40 so as to pivot about a first pivot 74 set at its upper end portion 70A.

As shown in FIG. 2, a pedal boss hole 76 is formed at the upper end portion 70A of the pedal arm 70. A pedal boss 78 formed in a cylindrical shape is press-fitted into the pedal boss hole 76 in the surface-perpendicular direction. A bushing 80 is fitted in the axial center portion of the pedal boss 78 from either axial end portion, and then a cylindrical collar 82 is inserted. The axial length of the collar 82 is set so as to be equal to the distance between the opposed surfaces of the pair of side plate portions 40. With both axial end faces of the collar 82 abutted against the opposed surfaces of the pair of side plate portions 40, a mounting bolt 84 is inserted into the collar 82 from the outside of one of the side plate portions 40, a nut 86 is threaded onto the mounting bolt 84 from the outside of the other side plate portion 40, and thus the brake pedal 10 is pivotally supported so that is can pivot about the mounting bolt 84. It should be noted that a return spring (not shown) is locked onto an upper-end bent portion 70B of the pedal arm 70. The return spring constantly biases the brake pedal 10 toward its initial position (position indicated by the solid line in FIG. 1).

As shown in FIGS. 1 and 2, a link mechanism 90 is provided on the vehicle rear side of the upper end portion 70A of the pedal arm 70 described above. The link mechanism 90 includes a first link 92 formed in a substantially arm-like shape (L-shape or the like) as seen in side view, and a pair of left and right linear second links 94 in the vehicle width direction which connect the first link 92 and the upper-end bent portion 70B of the pedal arm 70 to each other in a relatively rotatable manner.

The first link 92 includes a main body portion 92A that extends substantially along the vehicle vertical direction in an assembled state, a front end portion 92B that extends toward the front of the vehicle from the lower end portion of the main body portion 92A to a position below the upper-end bent portion 70B of the pedal arm 70, and an arm portion 92C that extends toward the rear of the vehicle from the upper end portion of the main body portion 92A and then further extends toward the obliquely rear upper side of the vehicle.

The front end portion 92B of the first link 92 and the upper-end bent portion 70B of the pedal arm 70 are rotatably connected to each other by the pair of left and right second links 94 in the vehicle width direction. Here, one end portion of the second link 94 and the upper-end bent portion 70B of the pedal arm 70 are rotatably connected to each other by a pin 96, and the other end portion of the second link 94 and the front end portion 92B of the first link 92 are rotatably connected to each other by a pin 98.

Further, the lower end portion of the main body portion 92A of the first link 92 is pivotally supported on the pair of side plate portions 40 and the pair of side wall portions 36A of the pedal bracket support 36 so as to pivot about the second pivot 100. The second pivot 100 is configured in the same manner as the first pivot 74, and a boss 102, a pair of bushes 104, a collar 106, a mounting bolt 108, and a nut 110 are used for the second pivot 100.

The distal end portion of a push rod (operating rod) 60, which projects toward the rear of the vehicle from the axial center portion of the brake booster 20, is connected to the upper-end front portion of the main body portion 92A of the first link 92 so as to be rotatable about the mounting bolt 108 (the second pivot 100) relative to the front upper end portion of the main body portion 92A of the first link 92. More specifically, a clevis 62, whose both sides in the vehicle width direction are projected toward the vehicle rear side as seen in a sectional view, is attached to the end portion on the vehicle rear side of the push rod 60. The upper-end front portion of the main portion 92A of the first link 92 is inserted on the inner side with respect to the vehicle width direction of the clevis 62. Then, in this state, a clevis pin 64 passes through both side portions of the clevis 62 and the upper-end front portion of the main portion 92A of the first link 92, and a β-pin is inserted and locked into the penetrated end portion, thereby connecting the end portion on the vehicle rear side of the push rod 60 and the main body portion 92A of the first link 92 to each other so as to be relatively rotatable about the mounting bolt 108.

Further, as shown in FIG. 1, a bead 112 as a deformation portion is formed at the connecting part (that is, a corner including a ridge line) between the above-described bottom wall portion 34A of the sub pedal bracket 34 and each of the pair of left and right side wall portions 34B in the vehicle width direction. The bead 112 has a triangular profile (i.e.; the protruding portion that is protruded to the vehicle front side), and is formed on the ridge line of the intersection corner between the bottom wall portion 34A of the sub pedal bracket 34 and the pair of left and right side wall portions 34B in the vehicle width direction. It should be noted that the position where the bead 112 is formed is set at a position slightly offset toward the vehicle upper side with respect to the terminal end portion (upper end portion) of the slit 52 described above. Of the bottom wall portion 34A of the sub pedal bracket 34, the portion located on the vehicle upper side with respect to the part where the bead 112 is formed is referred to as "non-deformation portion 114".

Further, when fully assembled, the rear end edge at the upper end portion of the arm portion 92C of the first link 92 described above is arranged at a predetermined position on the vehicle upper side with respect to the portion where the bead 112 is formed, that is, opposite, but not in contact with the non-deformation portion 114.

Next, the operation and effect of this embodiment will be described.

First, a brief description will be given of a normal brake operation. When the pedal pad 72 of the brake pedal 10 is depressed as shown in FIG. 1, the brake pedal 10 swings toward the front of the vehicle (arrow A direction) about the mounting bolt 84. The upper-end bent portion 70B of the brake pedal 10 thus rotates in a clockwise direction (arrow B direction) in FIG. 1 about the mounting bolt 84. Therefore, the front end portion 92B of the first link 92 is pressed toward the vehicle lower side by the second link 94, which causes the first link 92 to swing in a counterclockwise direction (arrow C direction) about the mounting bolt 108. Accordingly, the main body portion 92A of the first link 92 swings in the counterclockwise direction about the mounting bolt 108, and the push rod 60 is pressed substantially toward the front of the vehicle (arrow D direction). When the push rod 60 is pushed in substantially toward the front of the vehicle, the depression force driver applied to the pedal pad 72 is boosted by the brake booster 20 and converted into hydraulic pressure by the master cylinder 22. That is, the depression force applied to the pedal pad 72 of the brake pedal 10 is transmitted to the brake booster 20 and the master cylinder 22 via the first link 92 and the push rod 60 and converted into predetermined hydraulic pressure.

Figure 4:
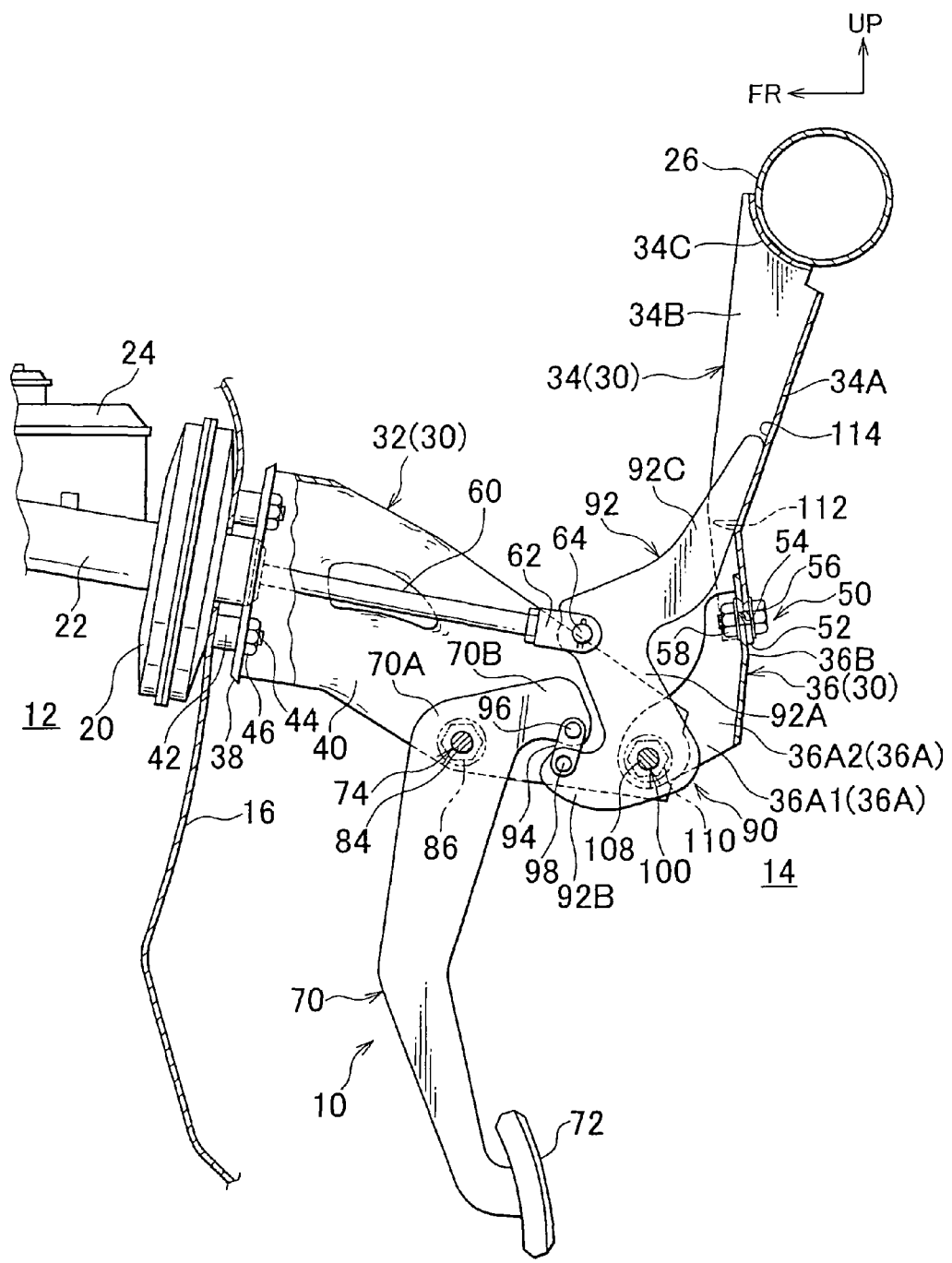
FIG. 4 is an operational view showing the deformation of the brake pedal support system shown in FIG. 1 when an external force equal to or greater than a first predetermined value acts on the vehicle front section.

In this regard, when, in a normal state shown in FIG. 1, an external force equal to or greater than a predetermined value (a first predetermined value) acts on the vehicle front section, the load at this time is transferred to the dash panel 16 via the master cylinder 22 and the brake booster 20, which may cause the dash panel 16 to be displaced toward the rear of the vehicle as shown in FIG. 4. In this case, after the rearward displacement of the dash panel 16, the above-described load is transferred to the instrument panel reinforcement 26 via the pedal bracket 30 (the main pedal bracket 32, the pedal bracket support 38, and the sub pedal bracket 34). However, because the instrumental panel reinforcement 26 is a high-strength and high-rigidity member, the instrumental panel reinforcement 26 undergoes minimal deformation toward the rear of the vehicle. Hence, as a result, such a relative displacement of the instrumental panel reinforcement 26 in the longitudinal direction of the vehicle towards the dash panel 16 is reduced.

In this case, because the rigidity of the sub pedal bracket 34 is reduced by forming the bead 112, the sub pedal bracket 34 bends from the bead 112 into a dogleg shape, as seen in side view. It should be noted that at this time, the pedal bracket support 36 relatively rotates in the counterclockwise direction about the second pivot 100 with respect to the main pedal bracket 32, so the shape of the pedal bracket 30 as a whole becomes a projected bent shape projecting toward the vehicle lower side.

Because the sub pedal bracket 34 undergoes bending deformation at the part where the bead 112 is formed as described above, there is minimal deformation of the non-deformation portion 114, which is located on the vehicle upper side with respect to the formation position of the bead 112 in the sub pedal bracket 34, toward the rear of the vehicle. The distal end portion of the arm portion 92C of the first link 92 is thus brought into abutment with the non-deformation portion 114, and with a reaction force obtained from the non-deformation portion 114, the arm portion 92C of the first link 92 is pressed toward the front of the vehicle. The first link 92 is thus swung in a counterclockwise direction about the second pivot 100, and the front end portion 92B is rotationally displaced toward the vehicle lower side. Accordingly, the upper-end bent portion 70B of the pedal arm 70 of the brake pedal 10 is pulled in toward the vehicle lower side via the second link 94, which causes the brake pedal 10 to pivot in a clockwise direction about the first pivot 74. As a result, the pedal pad 72 is rotationally displaced toward the front of the vehicle.

According to this embodiment as described above, when an external force equal to or greater than a predetermined value acts on the vehicle front section, the pedal pad 72 of the brake pedal 10 are rotationally displaced toward the front of the vehicle with greater efficiency. As a result, it is possible to suppress the bending of the driver's knees due to the inertial movement of the driver which occurs when an external force equal to or greater than a predetermined value acts on the vehicle front section, which in turn makes it possible to keep the knees of the driver away from the steering column. Therefore, it is possible to provide enhanced protection for the driver's legs, in particular the driver's knees.

Figure 5:
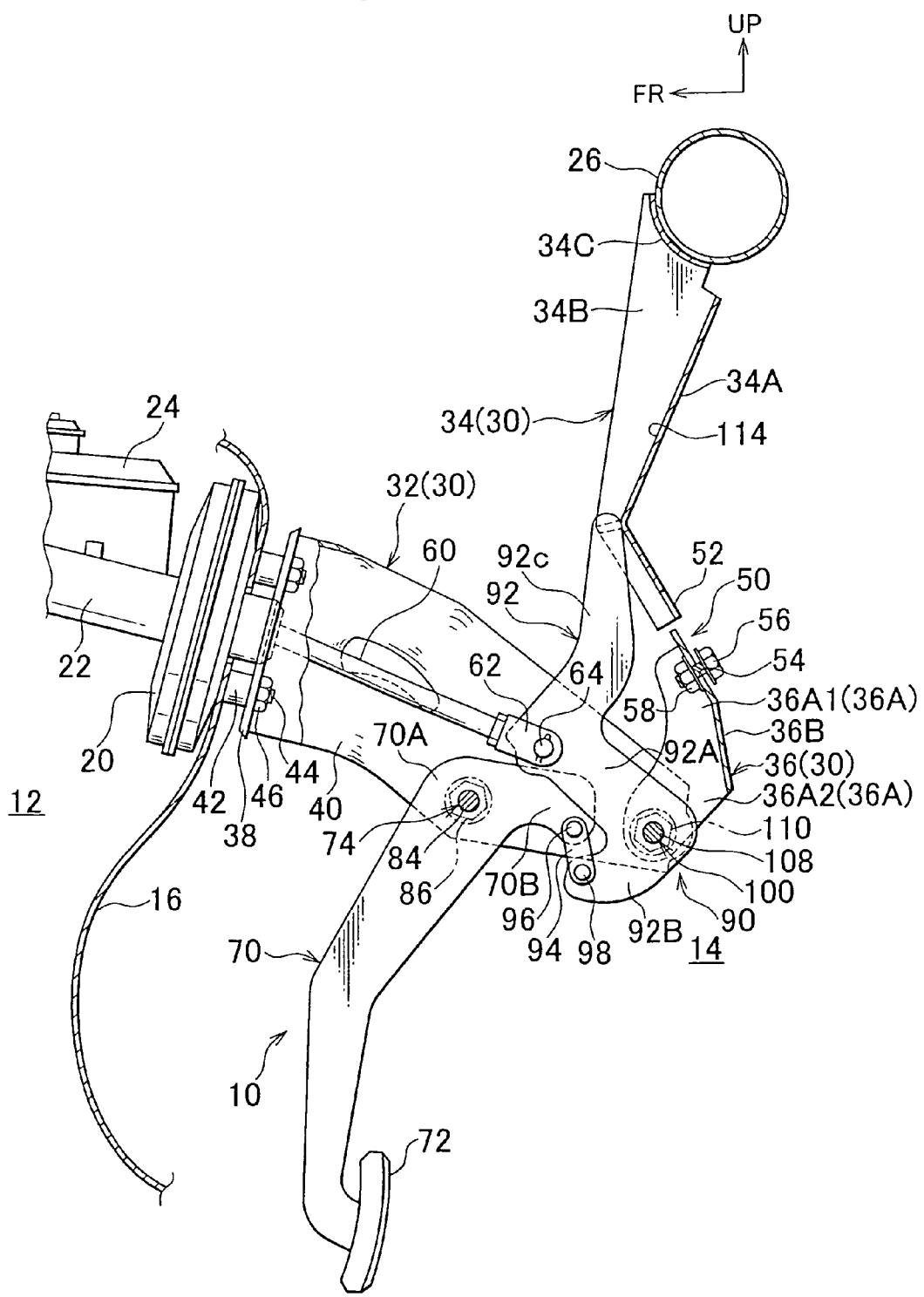
FIG. 5 is an operational view showing a state in which a sub bracket starts to separate from a pedal bracket support at the point of the separating mechanism from the state shown in FIG. 4.

As the relative displacement of the dash panel 16 toward the vehicle rear side further proceeds from the state shown in FIG. 4, as shown in FIG. 5, the pedal bracket support 36 separates from the sub pedal bracket 34, at the point of the separating mechanism 50. Specifically, when a shearing force acting between the upper end portion of the bottom wall portion 36B of the pedal bracket support 36 and the lower end portion of the sub pedal bracket 34 exceeds the fastening torque of the bolt 56 and the nut 58, the fastening between the two components is released, and the bolt 56 will separate from the sub pedal bracket 34 through the slit 52. In other words, when a external force acting exceeds a predetermined value as a second predetermined value which is greater than the first predetermined value, the sub pedal bracket 34 and the pedal bracket support 36 are separated from each other, at the point of the separating mechanism 50. The pedal bracket support 36 is thus separated from the sub pedal bracket 34. Thereafter, no load will be transferred to the instrumental panel reinforcement 26 that supports the sub pedal bracket 34. As a result, it is possible to reduce the load weight that is transferred to the instrumental panel reinforcement 26.

Further, in this embodiment, the pedal bracket 30 has a three-division structure including the main pedal bracket 32 attached on the dash panel 16 side, the sub pedal bracket 34 attached on the instrumental panel reinforcement 26 side, and the pedal bracket support 36 arranged between these two components and joining the two components to each other, and the bead 112 is provided to the sub pedal bracket 34 side. Therefore, the pedal bracket support 36 may be used as an extended surface of the bottom wall portion 34A of the sub pedal bracket 34. That is, by forming the pedal bracket support 36 in an L-shape or the like as seen in side view, and arranging the bottom wall portion 36B of the pedal bracket support 36 substantially on the extended surface of the bottom wall portion 34A of the sub pedal bracket 34, the lower end portion of the bottom wall portion 34A of the sub pedal bracket 34, located on the vehicle lower side with respect to the part where the bead is set, may be extended further toward the vehicle lower side. Therefore, a greater bending moment can be exerted on the part of the sub pedal bracket 34 where a pair of the beads 112 is formed. In other words, the bottom wall portion 36B serves the purpose of increasing the moment arm length, thus enabling a greater bending moment to be exerted on the bead formation part. As a result, the sub pedal bracket 34 may be quickly subjected to bending deformation at the bead formation part, which in turn enables the pedal pad 72 of the brake pedal 10 to be quickly displaced toward the front of the vehicle.

While in the above-described embodiment the pedal bracket 30 is divided into three parts including the main pedal bracket 32, the sub pedal bracket 34, and the pedal bracket support 36, the invention is not limited to the above structure. A two-part structure may be adopted by omitting the pedal bracket support 36. Further, a configuration may be adopted in which the pedal bracket is formed as an integral structure so as to have a substantially V-shaped in side view, and when an external force equal to or greater than a predetermined value acts on the vehicle front section, the front and rear portions of this pedal bracket undergo plastic deformation in such a way that their mutual distance diminishes.

Figure 6:
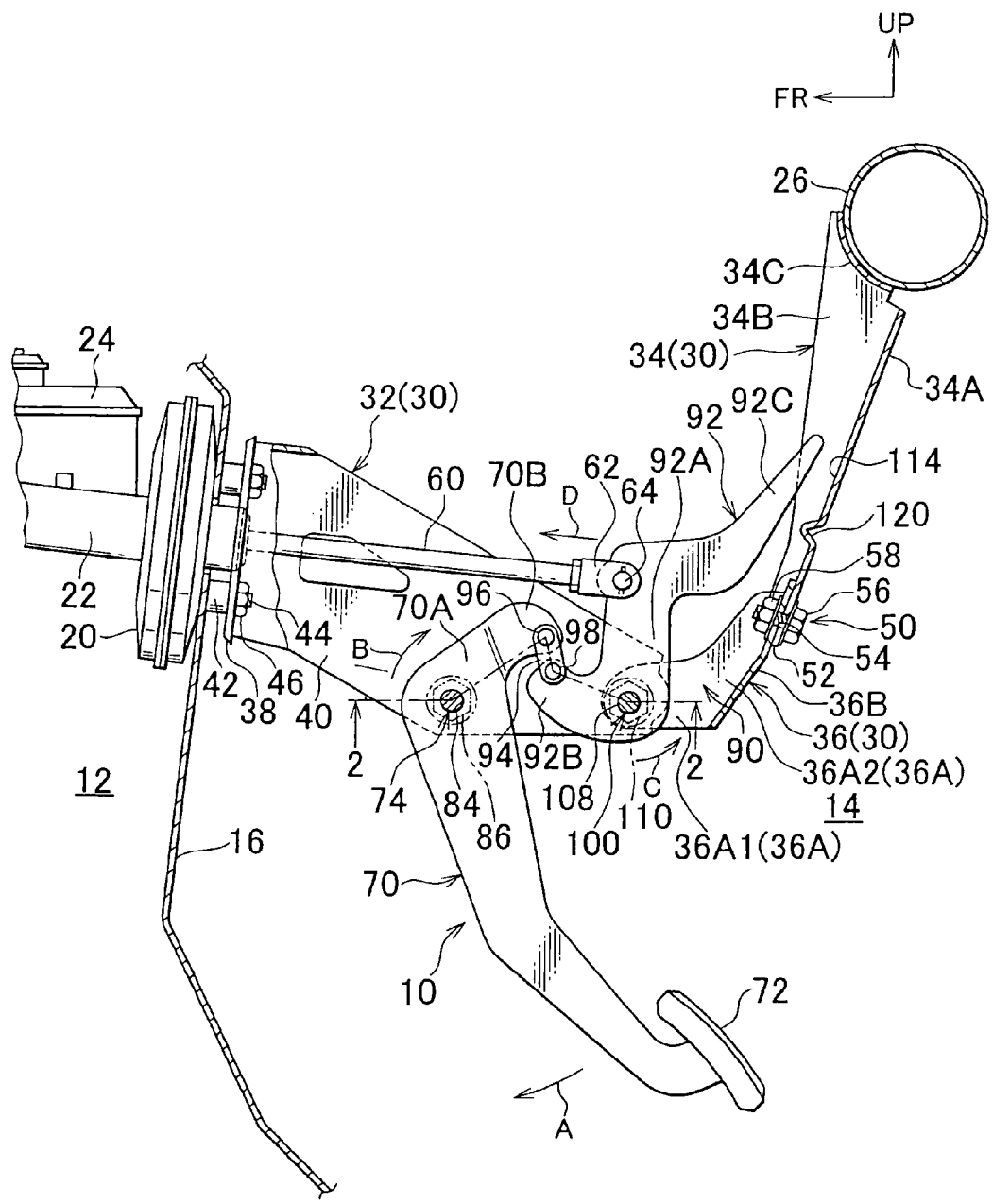
FIG. 6 is a side view corresponding to FIG. 1, showing a modification of a deformation portion.

While in the above-described embodiment the bead 112 that is triangular shaped in side view is formed as the deformation portion at the intersecting corner between the bottom wall portion 34A of the sub pedal bracket 34 and each of the pair of side wall portions 34B, this should not be construed restrictively. Any configuration may be applied as long as it allows the lower portion of the sub pedal bracket 34 to undergo bending deformation toward the rear of the vehicle when a load equal to or greater than a predetermined value and acting toward the vehicle rear side is transferred to the sub pedal bracket 34. For example, as shown in FIG. 6, a configuration may be adopted in which a recess (weak portion) 120 (i.e.; the protruding portion that is protruded to the vehicle front side) that is V-shaped in side view is formed on the bottom wall portion 34A side of the sub pedal bracket 34.

Although the separating mechanism 50 is provided in the above-described embodiment, the provision of a separating mechanism is not required. Likewise, while the pedal arm 70 of the brake pedal 10 and the first link 92 are connected in a relatively rotatable manner via the second link 94, the second link 94 may be omitted.

While the invention is applied to the suspended brake pedal 10 in the above-described embodiment, possible applications of the invention are not limited to this. The invention may be applied to any suitable suspended pedal, such as, for example clutch pedals.

It should be noted that the expression "located on the vehicle upper side with respect to the deformation portion and insusceptible to bending deformation" means "located on the vehicle upper side with respect to the deformation portion and substantially insusceptible to bending deformation". Therefore, the term non-deformation portion refers to either a portion that does not deform at all when the rear portion side of the pedal bracket undergoes bending deformation at the deformation portion or a portion that slightly deforms to an extent that does not impair the effect of the invention.

While the invention has been described with reference to example embodiments thereof, it should be understood that the invention is not limited to the example embodiments or configurations. To the contrary, the invention is intended to cover various modifications and equivalent arrangements. In addition, while the various elements of the example embodiments are shown in various combinations and configurations, which are example, other combinations and configurations, including more, less or only a single element, are also within the spirit and scope of the invention.

The invention claimed is:

1. A vehicle pedal support system, comprising:
    body-side components that are separated from each other in a longitudinal direction of the vehicle, and are displaced relative to each other so that a mutual distance between the body-side components in the longitudinal direction of the vehicle is decreased when an external force equal to or greater than a first predetermined value acts on a vehicle front section;
    a vehicle pedal that has at its lower end portion a depression surface to which a depression force of a driver is applied;
    a pedal bracket mechanism that is disposed between the body-side components and pivotably supports the vehicle pedal about a pivot;
    hydraulic pressure conversion section for converting the depression force applied to the depression surface of the vehicle pedal into hydraulic pressure while being swingably supported on the pedal bracket mechanism; and
    a link mechanism that connects the hydraulic pressure conversion section to an upper-end side of the vehicle pedal in a relatively rotatable manner, and transmits the depression force to the hydraulic pressure conversion section, wherein:
    a vehicle rear section side of the pedal bracket mechanism includes a deformation portion that serves as a point where the vehicle rear section side of the pedal bracket mechanism starts to undergo bending deformation toward a vehicle rear lower side at the time of the relative displacement between the body-side components, and a non-deformation portion that is located on a vehicle upper side with respect to the deformation portion and comes into contact with the link mechanism at the time of the relative displacement between the body-side components; and
    the link mechanism is pressed toward the vehicle front section at the time of the relative displacement between the body-side components, thereby causing the depression surface of the vehicle pedal to pivot toward the vehicle front section, the vehicle pedal support system further comprising:
    a separating mechanism that serves as a point where the vehicle rear section side of the pedal bracket mechanism and the vehicle front section side of the pedal bracket mechanism start to separate from each other in a portion of the pedal bracket mechanism extending on the vehicle lower side with respect to the deformation portion after the vehicle rear section side of the pedal bracket mechanism undergoes bending deformation at the deformation portion at the time of the relative displacement between the body-side components.

2. The vehicle pedal support system according to claim 1, wherein:
    when an external force acting on the vehicle front section exceeds a second predetermined value which is greater than the first predetermined value, the vehicle rear section side of the pedal bracket mechanism and the vehicle front section side of the pedal bracket mechanism are separated from each other by the separating mechanism.

3. The vehicle pedal support system according to claim 2, wherein:
    the separating mechanism includes a slit that is cut upward from a lower edge of the vehicle rear section side of the pedal bracket mechanism, and a bolthole that is formed in an upper end portion on the vehicle front section side of the pedal bracket mechanism, the slit and the bolthole being fastened together with a predetermined fastening torque using a bolt and a nut.

4. The vehicle pedal support system according to claim 1, wherein the pedal bracket mechanism includes:
    a first pedal bracket that is attached toward a vehicle dash panel of the body-side components;
    a second pedal bracket that is attached toward an instrumental panel reinforcement of the body-side components which is located toward a rear of the vehicle with respect to the vehicle dash panel while extending in a vehicle width direction, and that is provided with the deformation portion and the non-deformation portion; and
    a third pedal bracket that is provided between the first pedal bracket and the second pedal bracket that joins the first pedal bracket to the second pedal bracket.

5. The vehicle pedal support system according to claim 4, further comprising:
    a separating mechanism that serves as a point where the second pedal bracket and the third pedal bracket start to separate from each other in a portion of the second pedal bracket extending on the vehicle lower side with respect to the deformation portion after the second pedal bracket undergoes bending deformation at the deformation portion at the time of the relative displacement between the body-side components.

6. The vehicle pedal support system according to claim 5, wherein:

when an external force acting on the vehicle front section exceeds a second predetermined value which is greater than the first predetermined value, the second pedal bracket and the third pedal bracket are separated from each other by the separating mechanism.

7. The vehicle pedal support system according to claim 6, wherein:

the separating mechanism includes a slit that is cut upward from a lower edge of the second pedal bracket, and a bolthole that is formed in an upper end portion on the third pedal bracket, the slit and the bolthole being fastened together with a predetermined fastening torque using a bolt and a nut.

8. The vehicle pedal support system according to claim 1, wherein:

the deformation portion has a low-rigidity.

9. The vehicle pedal support system according to claim 8, wherein:

the deformation portion is protruding portion that is protruded to the vehicle front side.

10. The vehicle pedal support system according to claim 8, wherein:

the deformation portion has a weak structure.

* * * * *